United States Patent
Shelton et al.

(10) Patent No.: US 9,020,800 B2
(45) Date of Patent: Apr. 28, 2015

(54) METHOD AND APPARATUS FOR CONTROLLING ENERGY SERVICES BASED ON MARKET DATA

(75) Inventors: John Christopher Shelton, Falls Church, VA (US); Jay Craig Geinzer, Glenwood, MD (US); Brett Lance Galura, Falls Church, VA (US); Isaiah Dallas Jefferson, Jr., Mitchellville, MD (US)

(73) Assignee: The AES Corporation, Arlington, VA (US)

( * ) Notice: Subject to any disclaimer, the term of this patent is extended or adjusted under 35 U.S.C. 154(b) by 417 days.

(21) Appl. No.: 13/527,354

(22) Filed: Jun. 19, 2012

(65) Prior Publication Data

US 2012/0323389 A1     Dec. 20, 2012

Related U.S. Application Data

(60) Provisional application No. 61/499,053, filed on Jun. 20, 2011.

(51) Int. Cl.
*G06G 7/54*     (2006.01)
*G06Q 50/06*    (2012.01)
(Continued)

(52) U.S. Cl.
CPC .............. *G06Q 50/06* (2013.01); *G06Q 10/04* (2013.01); *Y04S 50/00* (2013.01)
USPC ............ 703/18; 703/13; 705/7.29; 705/7.31; 700/291; 700/295; 700/297

(58) Field of Classification Search
CPC ......... G06Q 50/06; G06Q 10/04; Y04S 50/00
USPC .................. 700/291, 295, 297; 703/13, 18; 705/7.29, 7.31
See application file for complete search history.

(56) References Cited

U.S. PATENT DOCUMENTS 5,933,355 A    8/1999  Deb
8,249,836 B2 * 8/2012  Yoon et al. ................ 703/2
(Continued)

FOREIGN PATENT DOCUMENTS

CA     2677384         3/2011
KR     20090019079 A   2/2009
WO     2010/000664 A2  1/2010

OTHER PUBLICATIONS

International Search Report (PCT/ISA/210) dated Jan. 21, 2013, issued in corresponding International Application No. PCT/US2012/043143.

(Continued)

*Primary Examiner* — Ramesh Patel
(74) *Attorney, Agent, or Firm* — Buchanan Ingersoll & Rooney PC (57) ABSTRACT

Apparatus, systems, computer readable media and methods for controlling power realized by energy service equipment based on market data are disclosed. A method simulates execution of control models, as simulation results; selects one of the control models during a first period; and controls operation of the energy services equipment in a second period, using the selected control model. According to an exemplary apparatus, each control model is based on a set of changing market data and controls operation of energy service equipment. A system controls power realized from different energy service equipment using market data. The system includes a model processor that simulates execution of model sets using market data to generate a simulation result; a model selector that selects a model of each set based on simulation results; and a processor that controls operation of the different energy service equipment using the selected model of each respective model set.

29 Claims, 7 Drawing Sheets

(51) Int. Cl.
  *G06Q 10/04* (2012.01)
  *G06G 7/62* (2006.01)
  *G06Q 10/00* (2012.01)
  *G06Q 30/00* (2012.01)
  *G05D 3/12* (2006.01)
  *G05D 5/00* (2006.01)
  *G05D 9/00* (2006.01)
  *G05D 11/00* (2006.01)
  *G05D 17/00* (2006.01)

(56) References Cited

U.S. PATENT DOCUMENTS

| | | | |
|---|---|---|---|
| 2002/0120352 A1 | 8/2002 | Stothert et al. | |
| 2005/0033481 A1* | 2/2005 | Budhraja et al. | 700/286 |
| 2008/0103737 A1* | 5/2008 | Yoon et al. | 703/4 |
| 2010/0100250 A1* | 4/2010 | Budhraja et al. | 700/291 |
| 2010/0332373 A1* | 12/2010 | Crabtree et al. | 705/37 |
| 2011/0148114 A1 | 6/2011 | Garcia | |
| 2012/0022707 A1* | 1/2012 | Budhraja et al. | 700/292 |
| 2012/0278015 A1* | 11/2012 | Budhraja et al. | 702/62 |
| 2013/0030784 A1* | 1/2013 | Viassolo et al. | 703/18 |
| 2013/0282314 A1* | 10/2013 | Budhraja et al. | 702/60 |

OTHER PUBLICATIONS

Written opinion of the International Searching Authority (PCT/ISA/237) dated Jan. 21, 2013, issued in corresponding International Application No. PCT/US2012/043143.

Feb. 3, 2015 Extended European Search Report issued in EP Application No. 12803431.1.

* cited by examiner

FIG. 1

| | | Frequency | | | |
|---|---|---|---|---|---|
| | | | Response Deadband | | |
| | | Very Low | Slightly Low | Set Point | Slightly High | Very High |
| State of Charge | Above Range | Discharge | Discharge | 0 or Trickle Discharge | 0 or Trickle Discharge | Charge |
| | In Range | Discharge | Discharge or 0 | 0 | Charge or 0 | Charge |
| | Below Range | Discharge | 0 or Trickle Charge | 0 or Trickle Charge | Charge | Charge |

METHOD AND APPARATUS FOR CONTROLLING ENERGY SERVICES BASED ON MARKET DATA

CROSS-REFERENCE TO RELATED APPLICATIONS

The present application claims the benefit of U.S. Provisional Appl. No. 61/499,053 entitled "Method and Apparatus for Controlling Energy Services Based on Market Data," filed Jun. 20, 2011 which is incorporated by reference herein in its entirety.

FIELD OF THE DISCLOSURE

The present disclosure relates to apparatus, systems and methods for providing energy services on a power grid and more particularly, to control of energy services based on market data.

BACKGROUND OF THE DISCLOSURE

Typically, a utility obtains electric power from one or more generation sources, such as gas-fired, coal-fired, nuclear and/or hydroelectric power plants, for delivery to customers via a distribution grid. The power supplied by these sources can vary moment-to-moment. Generally, the sources can be regulated to meet the demands of customers while at the same time conforming to the standards for such power. These generation sources are controlled in order to match the load. When the load is higher than the power being delivered, the power from the generation sources should be increased and when the load is lower than the power being delivered, the power from the generation sources should be decreased so that electrical devices on the electric grid remain fully operational.

BRIEF SUMMARY

The present disclosure is directed to apparatus, systems, computer readable media and methods for controlling power realized by energy service equipment based on market data. One exemplary method includes simulating, by a model processor, execution of a plurality of control models, as simulation results, selecting one of the control models during a first period; and controlling operation of the energy services equipment in a second period, subsequent to the first period, using the selected control model. Each control model is based on set of changing market data and controls operation of energy service equipment.

Another exemplary method includes: (1) simulating, by a model processor, execution of a plurality of control models of a first type and a plurality of control models of a second type, as simulation results; (2) determining a value associated with each simulation result simulated during a first period; (3) selecting, by a model selector, one control model of the first type and one control model of the second type that are associated with highest values for the first and second energy service equipment, respectively; and (4) controlling, by a processor, operation of the first and second energy service equipment in a second period, subsequent to the first period, using the selected control models of the first and second types that are associated with the highest values. The control models of the first type are configured to control operation of first energy service equipment and the control models of the second type are configured to control operation of second energy service equipment.

BRIEF DESCRIPTION OF THE DRAWINGS/FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION

By way of background, grid operators typically control the balance between supply and demand for electric power by soliciting different energy services including voltage regulation, frequency regulation, and VAR support services, among others. Each supplier may use a different control model (e.g., control algorithm or control scheme) to implement the supply of the solicited energy service.

What may be needed are control models that are flexible, adoptive, and dynamic to better adapt to the changing nature of the power supply from traditional power generators to more renewable sources and demand side load control.

To facilitate an understanding of the principles behind the present disclosure, an energy service unit which has a control model to enable frequency regulation and that employs batteries as energy storage cells will be described as an example of one energy service to which the present disclosure relating to the MDU can be applied. It is contemplated that these principles can be applied to other control models and other types of energy service units for traditional power generators and power storage devices. Moreover, one of skill would understand from this disclosure implementation of other control models (control algorithms and control schemes) with the context of the MDU control system. As will be appreciated by persons skilled in the relevant art(s), the MDU may include various switches and relays, a database and computer equipment including a non-transitory computer readable storage medium having stored therein computer software such as program code to control at least the MDU system.

In this document, the terms "computer program medium," "non-transitory computer readable medium," and "computer usable medium" are used to generally refer to storage media such as a hard disk, memories, which can be memory semiconductors (e.g., DRAMs, etc.).

Figure 1:
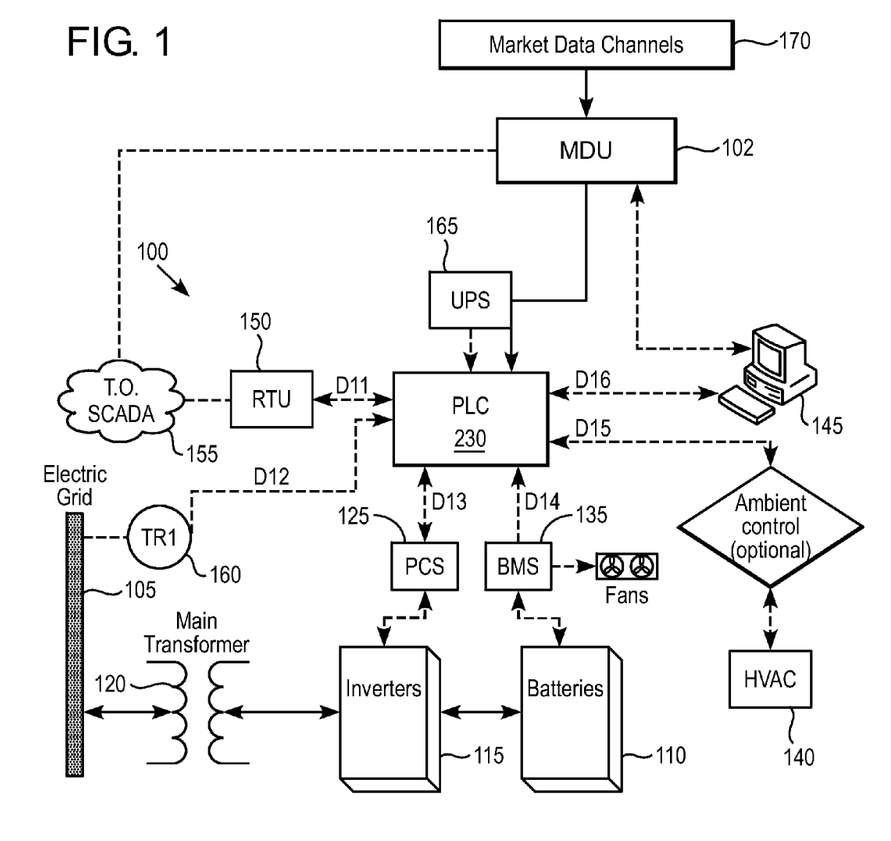
FIG. 1 is a block diagram illustrating exemplary energy service unit accordance with exemplary embodiments.

FIG. 1 is a block diagram illustrating an exemplary energy storage system in accordance with exemplary embodiments.

Referring to FIG. 1, an energy service unit 100 (e.g., frequency or power regulation, among others) may be configured to be controlled by a Market Data Unit (MDU) 102. The energy service unit 100 may supply energy (e.g., power) to and may receive energy from an electric grid 105. For example, the energy may be provided through a local substation or transmission lines. In this manner, the electricity grid 105 may provide an appropriate amount of power for the current load (e.g., may enable a balance of power from suppliers and consumers), at a specified nominal frequency (e.g., generally 60 Hz in the United States and/or 50 Hz in some other parts of the world).

The energy service unit 100 may be configured to be controlled by the MDU 102 in a first operational mode and to be controlled by a Programmable Logic Controller (PLC) 130 in a second operational mode (e.g., a default or standalone mode). For example, the energy service unit 100 may be a standalone unit capable of supplying power to and receiving power from the electric grid 105 using a control algorithm or control model to provide grid frequency stabilization. The control model may be executed at the PLC 130 which may control the energy service unit 100 without the MDU 102. When the MDU 102 is operational, the energy service unit 100 may be controlled from the MDU 102.

The MDU 102 may output signals to the PLC 130 to emulate input signals from the SCADA system 155 and/or the transducer 160 to enable control from the MDU 102. For example, the PLC 130 may not know that the MDU 102 is controlling operation of the energy service unit 100. The MDU 102 may send signal to the PLC 130 which may cause the PLC 130 to control operations of the energy service unit 100 as provided by a selected control algorithm (or selected control model) of the MDU 102. In this manner, the MDU 102 may be added to the energy service unit 100 without modification to the energy service unit 100 or the PLC 130.

Default or Standalone Operational Mode

In the exemplary default or standalone mode, the SCADA system 155 may be coupled to the PLC 130 and may provide for default or standalone operations of the energy service unit 100 as a frequency regulation unit responsive to the MDU 102 not being installed or not being currently operational. For example, the PLC 130 may include a control algorithm or control model executable on the PLC 130 that controls the energy service unit 100 to provide frequency regulation. In this mode, the PLC 130 may act as the control processor for the energy service unit 100. This exemplary control model will be described below and may form one of the control models of the MDU 102, as well.

The energy service unit 100 may include a set of energy storage cells 110, for example, batteries. The set of energy storage cells 110 may be energetically coupled with the electric grid 105. The term "energetically coupled" generally refers to energy that can flow from one object to another. For example, electricity in the form of an Alternating Current (AC) or Direct Current (DC) can flow from one object to another in a bi-directional fashion. The energy storage cells 110 may supply energy to the electric grid 105 or may receive (e.g., consume) energy from the electric grid 105, for example, (1) to regulate the grid frequency; or (2) to provide voltage regulation; or (3) to provide VAR support, among others.

When providing energy to the electric grid 105, a DC current may travel from the energy storage cells 110 to bidirectional AC/DC converters 115, which convert the DC current to an AC current. In various exemplary embodiments, inverters may be used for the DC to AC conversion. When storing energy from the electric grid 105, rectifiers may be used for AC to DC conversion.

A power conversion system (PCS) 125 may provide a logical control system for the AC/DC bi-directional converters 115. A programmable logic controller (PLC) 130 may instruct the PCS 125 to connect or disconnect the AC/DC bi-directional converters 115 from the energy storage cells 110 and/or the electric grid 205.

The PLC 130 may send data signals to the PCS 125 and may receive data signals from the PCS 125 via a data interface (DI) line 3. Exemplary inputs to the PLC 230 from the PCS 125 may include a state of readiness signal, and exemplary outputs from the PLC 130 may include an amount of energy to charge or discharge, and instructions to connect/disconnect the AC/DC bi-directional converters 115 to/from the electric grid 105 and/or the energy storage cells (e.g., batteries) 110.

To maintain the batteries 110 in a state that enables them to respond to requests to add energy to or absorb energy from the electric grid 105, the energy service unit 100 may include a battery management system (BMS) 135. The BMS 135 may balances energy levels in the cells of the batteries 110 and may maintain knowledge of a state-of-charge (SOC) of the cells of the batteries 110. The SOC of the batteries 110 is a measurement of the current ability of the batteries 110 to supply (send) energy and to consume (receive) energy. Exemplary inputs to the PLC 130 from the BMS 135, via DI line 4, may include the power capabilities of the batteries 110 (e.g. in MWsec), faults, and/or the SOC, among others.

In certain exemplary embodiments, the SOC may be a percentage that runs from 0% to 100%, where 100% means that no more energy can be stored in the batteries 110. The SOC may be calculated from open circuit and/or closed circuit voltage levels. It is contemplated, however, that the SOC may be calculated in any number of ways, as known to one skilled in the art.

A remote terminal unit (RTU) 150 may be used to connect to a Supervisory Control And Data Acquisition (SCADA) system 155 via DI line 1. In certain exemplary embodiments, the SCADA system 155 may be associated with a grid or utility system operator that operates the electric grid 105. Exemplary inputs from the SCADA system 155 to the PLC 130 may include a request to regulate the grid frequency. The request may include an energy amount (e.g. in MW) to charge or discharge, and the grid frequency. Exemplary outputs from the PLC 130 may include a status and availability of the energy service unit 100 and whether the energy service unit is operating in the default mode. In certain exemplary embodiments, the PLC 130 may send information to the SCADA system 155 about the SOC or its capabilities, so that the SCADA system 155 knows ahead of time whether or not the energy service unit 100 can provide frequency regulation service.

The PLC 130 can also receive data signals over DI line 2 from a transducer 160, which is coupled to the electric grid 105. The transducer 160 may sense the AC signal on the electric grid 105 to determine the frequency of the electricity being delivered over the electric grid 105.

In other exemplary embodiments, the PLC 130 may send and may receive signals (via DI line 5) from an HVAC unit 140 to maintain proper environmental conditions for the batteries 110 and other components. Exemplary inputs to the PLC 130 from the HVAC 140 may include temperature and humidity, among others and exemplary outputs to the HVAC 140 may include a thermostat setting or other control setting of the HVAC 140.

In certain exemplary embodiments, a computer 145 may be connected to the PLC 130 for controlling, programming, or setting parameters of the PLC 130. The computer 145 may also be used to monitor the energy service unit 100. Exemplary inputs from the computer 145 to the PLC 130 may include shut-down and/or start-up signals, among others. Exemplary outputs to the computer 145 may include log events, log data, and/or reports of alerts, among others.

When frequency regulation is being performed, a request may be received at the PLC 130 from the operator of the electricity grid through the SCADA system 155 and the RTU 150. The request may include instructions to absorb energy from or add energy to the electricity grid 105. In certain exemplary embodiments, the request may specify how much energy to transfer or a rate for the transfer. In response, energy may transfer to/from the electric grid 105, depending on whether the request is to increase or decrease the current grid frequency (or equivalently to absorb or add energy).

Thereafter, the regulation may be stopped in response to another dispatch request from the grid operator. For example, the grid operator may deem that the grid frequency may be at or near the desired nominal frequency. The grid operator may also deem that the frequency is not likely to change soon, for example, because the grid operator may forecast that the energy generation by online plants will match the expected load. In another example, the frequency regulation may be stopped based on a measurement by the energy service unit 100 that the grid frequency is at or near the desired value. The frequency regulation may also be stopped for other reasons, such as the detection of a fault.

During the frequency regulation, the SOC of the batteries 110 may rise or fall dramatically. For example, the batteries 110 may have transmitted a significant amount of energy to the electric grid 105, thus leaving the batteries 110 with very little charge (e.g. an SOC of about 20%). In another example, the batteries 110 may have received a lot of energy from the electric grid 105, thus leaving the batteries 110 with a high amount of charge (e.g. an SOC of about 85%). In both of these instances, the batteries 110 may be in a poor condition to continue to regulate the grid frequency if more energy needs to be respectively added or absorbed. Thus, to provide a more reliable service, the charge on the batteries 110 may be modified in accordance with a control algorithm or control model to maintain it within a desirable range for the greatest amount of time possible.

The control model may increase or decrease the charge, as appropriate to balance the appropriate SOC with the supply/consumption of the power from the electric grid 105. The control model may determine that the grid frequency is in a deadband such that no frequency regulation occurs. In this case, the control model of the PLC 130 may determine that charge may be added/removed until the SOC value is within a specified range. The SOC value may be monitored by the control model at the PLC 130 based on information from the BMS 135. For example, the deadband range may be centered around 50% (the target state) so that the energy service unit 100 can equally provide or receive energy. In other exemplary embodiments, the target state may be higher or lower than about 50%, for example, when it is known that a large transfer in a specific direction may be desired.

Figure 2:
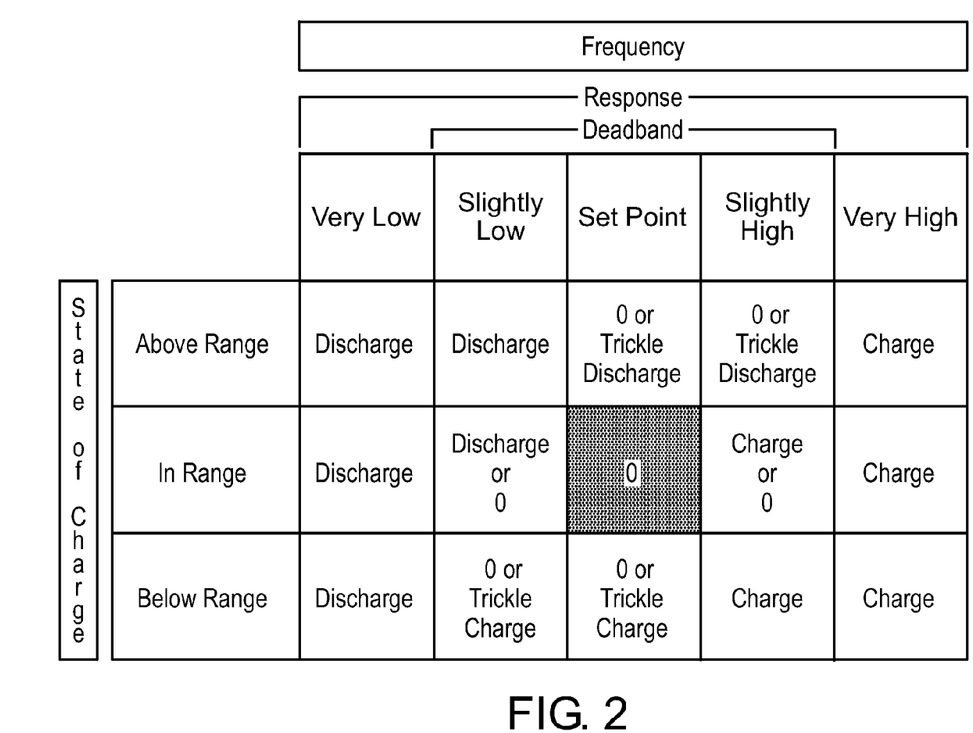
FIG. 2 is a table depicting an example of respective actions taken for various states of grid frequency and state of charge of the energy service unit of FIG. 1 to illustrate an exemplary control model for the energy service unit.

FIG. 2 is a table depicting an example of respective actions taken for various states of grid frequency and state of charge of the energy service unit 100 of FIG. 1 to illustrate an exemplary control model for the energy service unit 100.

Referring to the table of FIG. 2, an exemplary control model is illustrated and provides an example of the operations that may be carried out to provide ancillary services on the electric grid 105 and to maintain the SOC of the battery cells 110 that may be used to support grid frequency services. The rows of the table correspond to three respective ranges of the SOC, namely: (1) above an upper limit L2 (or "above range") (e.g., with a predetermined upper threshold of about 55% of capacity); (2) between the limits L1 and L2 ("in range") (e.g., below the predetermined upper threshold and above a predetermined lower threshold of about 45% of capacity); and (3) below the lower limit L1 ("below range"). The columns of the table illustrate different respective ranges for the grid frequency, relative to the nominal set point (e.g., 60 Hz in the United States).

The cells of the table with darker shading indicate actions that may be taken in response to a formula or a command dispatched from a grid or system operator. The lighter shading indicates actions that may be taken to provide charge maintenance. When the instantaneous frequency is Very Low or Very High (e.g., outside of a deadband, for example, outside of the range of 60 Hz.+/−0.025 Hz), the action taken may be discharge of the energy storage cells 110 onto the electric grid 105, or charge of the energy storage cells 110 from the electric grid 105, respectively, assuming the energy storage cells 110 have an adequate capacity to perform the action.

When the frequency is within the deadband, but not at the nominal set point, the action to be performed may be dependent upon a combination of the grid frequency and the SOC of the energy storage cells 110. If the grid frequency is below the nominal set point, the energy storage cells 110 may be discharged when the SOC is "above range" and may be provided with a trickle charge when the SOC is "below range". If the grid frequency is above the nominal set point, the energy storage cells 110 may be provided with a trickle discharge when the SOC is "above range" and charged when the SOC is "below range".

First Operation Mode Using MDU

The MDU 102 may include the above described control model and other control models that may enable operation of the energy service unit 100 to provide frequency regulation services as well as other ancillary services such as; (1) voltage regulation services; or (2) VAR support services, among others. The MDU 102 may control the energy service unit 100 to allow the energy service unit 100 to adjust its personality (e.g., from frequency regulation to voltage regulation or VAR support) or to adjust its operations (from a more passive energy service provider to a more aggressive energy service provider) by changing the control model used to provide the energy service.

The MDU 102 may include any number of control models to facilitate the personality or operations changes. The MDU 102 may receive market data from market data channels 170 and from the SCADA system 155 (or system/grid operators). In certain exemplary embodiments, the MDU 102 may also receive transducer input from one or more transducers 160.

In certain exemplary embodiments, the MDU 102 may be retrofit to an existing PLC, for example, and the PLC 130 may not be aware of the function of the MDU 102. In this case, the PLC 130 may receive control signals from the MDU 102 that emulate data signals to the PLC 130. These control signals may cause the PLC 130 to operate the energy service unit 100 as intended by the selected control model executing at the MDU 102.

In other exemplary embodiments, the PLC 130 may be aware of the MDU 102 and may be configured to operate such that when the MDU 102 is operational, the MDU may act as the control processor for the energy service unit 100 and when the MDU 102 is not operational, the PLC 130 assumes control of the energy service unit 100. In this case, the PLC 130 may act as a gateway device passing (e.g., relaying) market data signals to the MDU 102 and passing control signals from the MDU 102 to the other components of the energy service unit 100.

Market data generally refers to any available data in the marketplace that may correlate to changes in future or anticipated energy services for the electric grid 105. For example market data may include: (1) weather information including (i) current or expected humidity information; (ii) current or expected cloud cover information; (iii) current or expected precipitation information; and/or (iv) current or expected temperature information, among others; (2) historical information such as (i) historical energy service pricing information, and/or (ii) historical electric load information, among others; (3) forecasted information such as (i) expected load; and/or (ii) expected power generator capacity, among others; (4) regional information such as locations and times of region events that may effect load conditions; (5) system operator information such as undervoltage or overvoltage indications, voltage regulation signals, frequency regulation signals, and/or VAR support signals, among others; and/or (6) detection signals such as frequency, voltage, power factor, and/or current signals from transducers, among others.

Although one control model is provided for grid frequency stabilization, it is contemplated that many other control models are possible. One of skill in the art understands from the present disclosure that many different control models may be implemented for voltage regulation, VAR support, frequency stabilization and/or other ancillary services.

In certain exemplary embodiments, the computer 145 may be connected to the MDU 102 for controlling, programming, or setting parameters of the MDU 102. Exemplary inputs and outputs from the computer 145 to the MDU 102 may be similar to or the same as those to the PLC 130.

When energy services is being solicited from the energy service unit 102 via the MDU 102, a request may be received at the MDU 102 from the operator of the electricity grid, for example, through the SCADA system 155 and the RTU 150. The request may include instructions to perform one or more different types of energy services, for example, to absorb energy from or add energy to the electricity grid 150. In certain exemplary embodiments, the request may specify how much energy to transfer or a rate for the transfer. In response to the request and other market data received by the MDU 102, the MDU may continue using one or more selected control models or may change the one or more selected control models, thus, effecting energy transfer to/from the electric grid 105.

Figure 3:
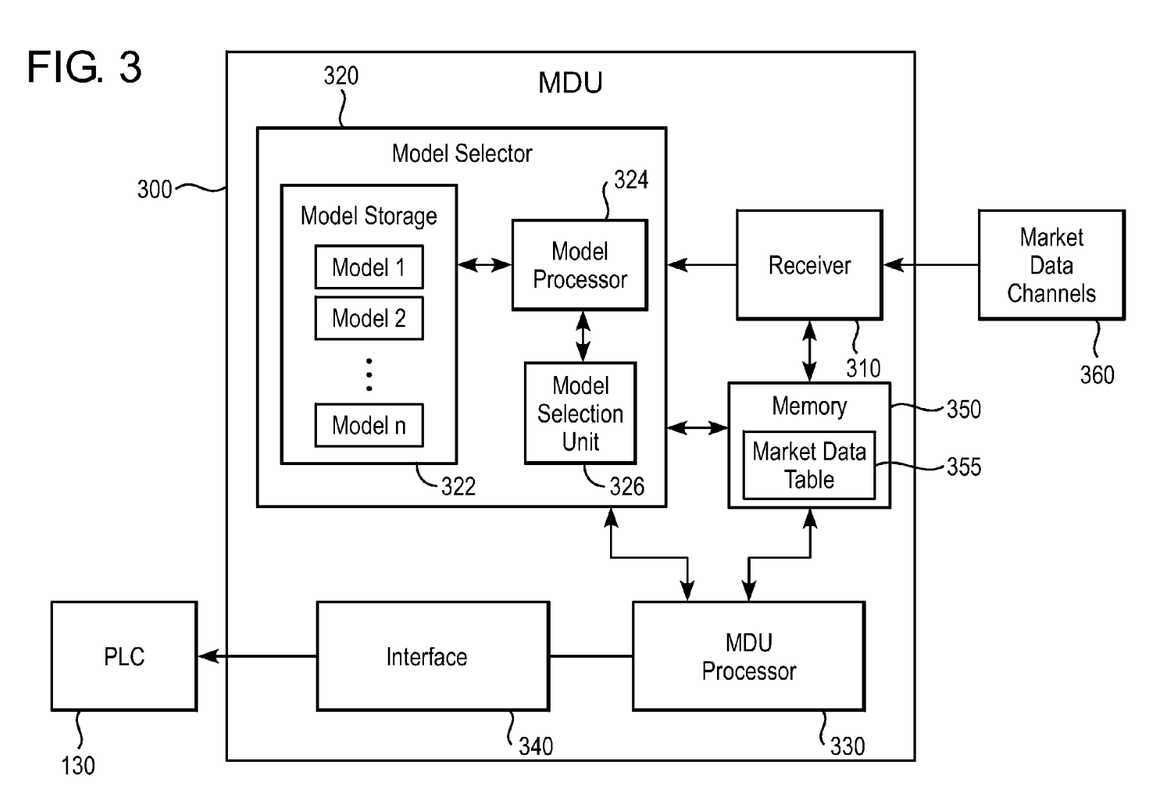
FIG. 3 is a block diagram illustrating an exemplary Market Data Unit (MDU) in accordance with exemplary embodiments.

FIG. 3 is a block diagram illustrating an exemplary MDU 300 in accordance with exemplary embodiments.

Referring to FIG. 3, the MDU 300 may include a receiver 310, a model selector 320, a MDU processor 330, and a control interface 340 and memory 350. The model selector 320 may include a model storage 322 for storing a plurality of models M1, M2 . . . Mn, a model processor 324 and a model selection unit 326.

The MDU 300, via the receiver 310, may receive market data via different information channels 360 such as: (1) the Internet; (2) news media; (3) journal reports; (4) electronic print media report; and control signals (e.g., grid operator signals and transducer signals), among others. The receiver 310 may continuously receive the market data from one or more market data information channels (MDIC) 360, A market data table or database 355 stored in memory 350 may include records that may: (1) identify a source of information from the MDIC 360 including the location of the information in the identified source; and (2) associate the identified source with one or more of the control models stored in the model storage 322 of the model selector 320. For example, in response to receiving information from an information channel, the receiver 310 may identify a portion of the information as pertinent to one or more control models and may parse and may store the information in memory 350 for use by the model processor 324 along with an identifier of the control models to which it is associated.

The model processor 324 may continuously, periodically or repeatedly simulate each of the control models using the identified market data stored in memory 350. Each piece of market data may also be stored with a timestamp indicating a time of reception of the market data. Each control model may be simulated: (1) as a thread in a multi-threaded system; (2) in a sequential order; or (3) in parallel in multiple processing cores.

In certain exemplary embodiments, each model may be simulated using the identified market data for a particular time period as inputs to the control models. For example, the market data identified with timestamps prior to a first threshold time may be used in control models during one series of simulation results.

Responsive to completion of each of the simulation results associated with the first threshold time by the model processor 324, the model selection unit 326 may select one of the control models for execution as the control model (e.g., control process) to manage or control the energy service unit 100 (e.g., power generation units and/or power storage units) during at least the next selection period. The model processor 324 may continuously and repeatedly cycle through (or execute in parallel) the control models to generate simulation results with the current market data and the model selection unit 326 may continuously and repeatedly select the same or a different control model to execute as the next control process for the control of the energy service unit 100 (e.g., power generation units and/or power storage units) during the next selection period.

The model selection unit 326 may provide a mechanism to dynamically and flexibly change or adjust control schemes based on market conditions and market indicators. In certain exemplary embodiments, the model selection unit 326 may select a different control model based on control model change rules. For example, each control model may be scored (e.g., a value given to the control model in a particular selection period). The value for each control model for each particular selection period may be stored in memory 350 such that the decision to switch to a new control model may be based on a trend of the control model values during a plurality of selection periods.

For example, a control model may be selected for control of the energy service unit 100 based on: (1) the highest value in the most current selection period; (2) the highest average value over a specified number of latest selection periods; (3) the highest average value excluding the highest and lowest values over a specified number of latest selection periods; (4) the highest median value over a specified number of latest selection periods; or (5) the highest median value excluding the highest and lowest values over a specified number of latest selection periods, among others.

It is contemplated that other criteria or rules for changing control models may be use in addition to or in lieu of the rules above. For example, the change of a control model may occur when the value associated with the control model to be selected by the model selection unit 326 exceeds that of the currently selected model by a specified magnitude or percentage. In addition, other rules may apply to prevent or block a change of the selected control model under certain conditions, for example that: (1) the selected model may not be changed if it has not executed control of the energy service unit 100 for at least a threshold period; or (2) a system administrator via computer 145 has overwritten the selection process and chosen a particular control model for a limited period or until changed again by the system administrator.

The model selection unit 326 may determine a value for each control model during each selection period, for example, by: (1) calculating the quantity of energy service realized for the particular period by the control model to determine a margin (e.g., profit margin) during the period and assigning a value to the control model for the selection period based on the calculated margin; or (2) optimizing an operating characteristic of the energy services unit 100 (for example by assigning a value to the control model that maximizes a quantity (e.g., the time that the energy services unit 100 is available (e.g., in the deadband) for charging or discharge energy during the selection period).

The MDU processor 330 may receive the control model or an identifier of the control model selected by the model selector 320 when the control model is changed and may execute the new control model for control of the energy service unit 100. The MDU processor 330 may execute this control by sending control signals to control interface 340 to control the energy service unit 100 via the PLC 130. The control interface 340 may understand the control scheme of the PLC 130 such that the control interface 100 may convert the control signals from the MDU processor 330 into a different set of data signal sent to the PLC 130 that the PLC 130 can interpret to cause the control process intended by the selected control model of MDU processor 330. That is, the control interface emulates data signal intended to generate the control process of the selected control model.

Although the MDU is shown having separate processors for the model processor and the MDU processor, it is contemplated that these processors may be a single processor or more than two processors. For example, each control model may be assigned a different processor such that each of the models may execute their simulations in parallel.

Although it is disclosed that the control interface 340 may be used to emulate data signals to the PLC 130, it is contemplated in certain exemplary embodiments that the control interface may be omitted. For example, when the MDU is not retrofit to an existing PLC, the MDU and the PLC may be configured to communicate directly via a common protocol (for example, via a Modbus protocol or other master/slave protocol.)

Figure 4:
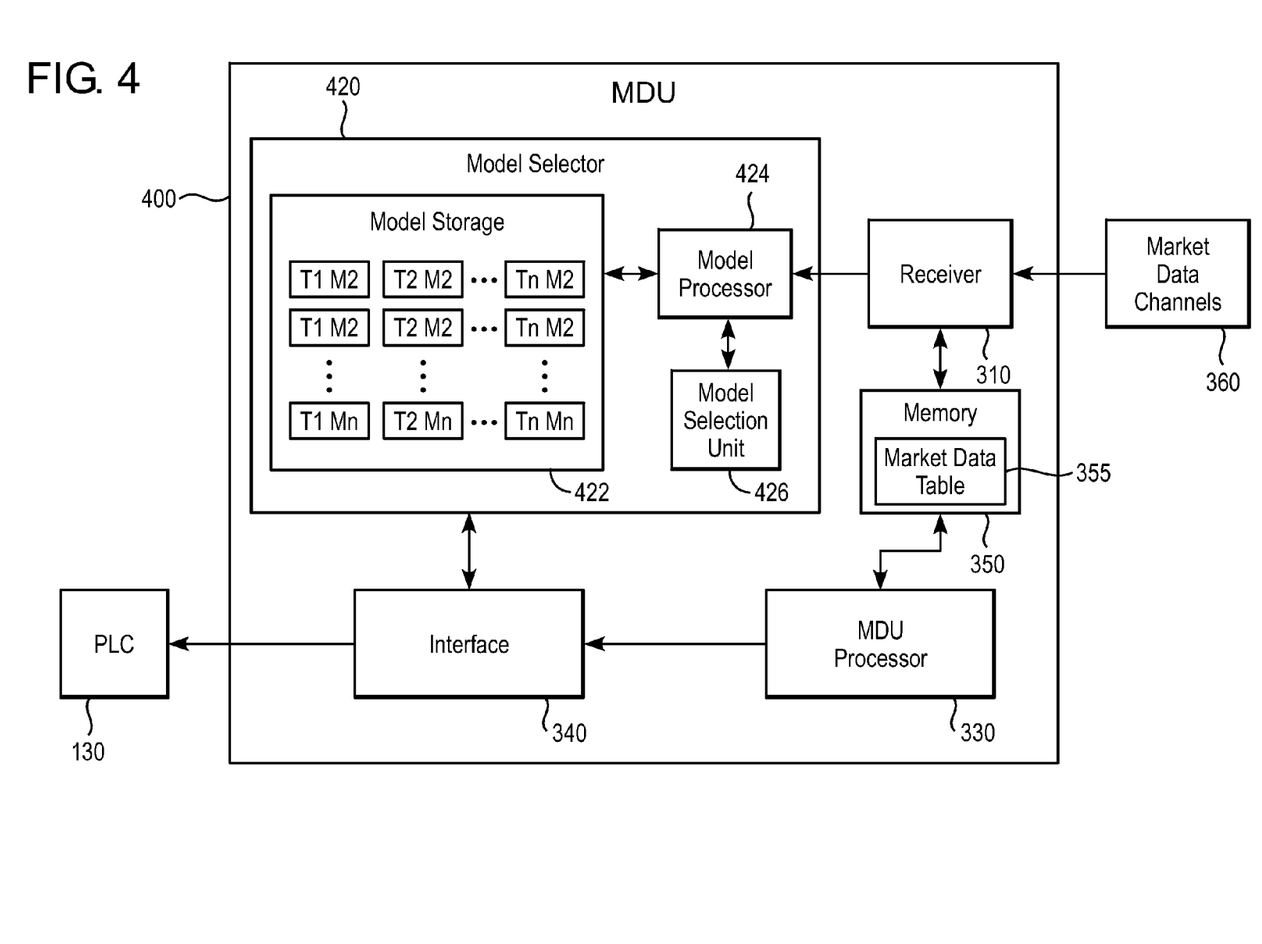
FIG. 4 is a block diagram illustrating another exemplary MDU in accordance with other exemplary embodiments.

FIG. 4 is a block diagram illustrating another exemplary MDU 400 in accordance with other exemplary embodiments.

Referring to FIG. 3, the MDU 400 has the same functions as the MDU 300 except that the model selector 420 may include: (1) a model storage 422 which may store control models of different types (e.g., T1M1, T1M2 . . . T1Mn; T2M1 . . . T2M2, T2Mn; TnM1, TnM2 . . . TnMn); (2) a model processor 424 which executes the control models of each type; and 93) a model section unit 426 which selects one control model of each type. The model selector 420 may store and may select (1) control models to facilitate fast response (for example, a ramp rate exceeding a threshold level) or a slow response (for example, a ramp rate below the threshold level); (2) control models to facilitate different energy services; and/or (3) control models associated with different portions of the energy service unit or other generation units (e.g., a control model of a first type for control of an energy storage unit and a control model of a second type for control of a power generation plant.)

After the market data is provided to the model processor 424, model processor 424 may execute a first series of simulations using the control models of the first type (e.g., T1M1, T1M2 . . . T1Mn) and one or more further series of simulations using the control models of the second type (e.g., T2M1, T2M2 . . . T2Mn) and further types (e.g., TnM1, TnM2 . . . TnMn) based on market data associated with a first selection period. The model selection unit 326 may select one of the control models of each of the first, second and further types and may control different portions of the facilities (e.g., energy service unit 100, energy storage units and/or power generators) using the appropriate type of control model for that portion of the facilities.

Figure 5:
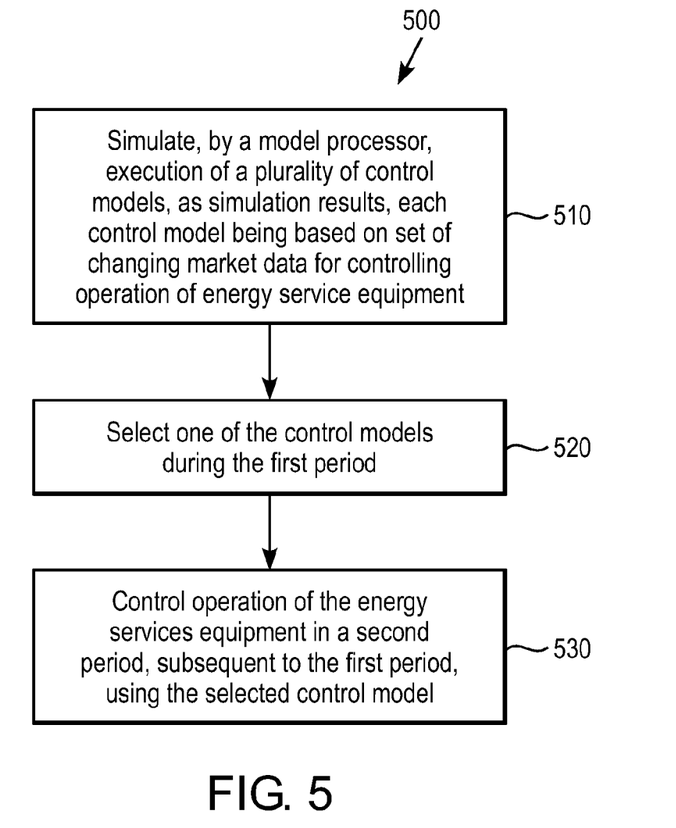
FIG. 5 is a flowchart illustrating steps by which energy services can be controlled using market data in accordance with exemplary embodiments.

FIG. 5 is a flowchart illustrating a method 500 of controlling energy services based on market data in accordance with exemplary embodiments. FIG. 5 is described with continued reference to the embodiments illustrated in FIGS. 1, 3 and 4. However, FIG. 5 is not limited to those embodiments. Note that the steps in the flowchart do not necessarily have to occur in the order shown.

Referring now to FIG. 5, the method 500 can control power realized by energy service equipment using market data. In step 510, execution of a plurality of control models is simulated, as simulation results. In an embodiment, this step is performed by a model processor 324 configured to simulate execution of the plurality of control models. Each of the control models can be based on set of changing market data (e.g., changing market conditions) and may control operation of the energy service equipment (e.g., energy storage and/or energy generation equipment). After the plurality of control models is simulated, control is passed to step 520.

In step 520, one of the control models during the first period is selected. In one embodiment, this step is performed by a model selector 320 or 420 configured to select one of the control models during the first period. After one of the control models during the first period is selected, control is passed to step 530.

In step 530, operation of the energy service equipment is controlled in a second period. In an embodiment, this step is performed by an MDU processor 330 configured to control operation of the energy service equipment in a second period, subsequent to the first period, using control model selected in step 530. For example, the MDU 330 processor can be configured to control operation of the energy service equipment in the second period by determining operating points for the energy service equipment 100 and managing the power realized by the energy service equipment 100 in accordance with the determined operating points.

In certain exemplary embodiments, the model selector 320 or 420 may determine a value associated with each simulation result and may select one of the control models based on the value associated with the simulation result of the selected control model.

The determined value may include one of: (1) a profit margin associated with the first period or a number of latest period or (2) a monetary value associated with the first period or a number of latest period; or (3) a common attribute or characteristic value associated with the energy storage or energy generation plant derived from the models, for example: (1) the time in the deadband for the battery cells 110; (2) the time satisfying requirement for an energy service (such as voltage regulation, or frequency control, among others); or (3) the thermal efficiency of a power generator, among others.

In certain exemplary embodiments, the model selector 320 or 420 may determine another value associated with each simulation result during the second period or a further period, subsequent to the first period and may select the control model associated with a highest value during the second or further period and/or control model change rules. The MDU processor 324 or 424 may control operation of the energy service equipment in a period subsequent to the second or further period using the selected control model associated with the highest value and/or the control model change rules.

In certain exemplary embodiments, the receiver 310 may receive the market data in one or more market information channels 360, may match the market data to one or more of the plurality of control models and the model processor 324 or 424 may execute each respective control model using the market data matched to the respective control model. The market data associated with each control model may be respectively different data.

In certain exemplary embodiments, the control interface 340 may convert control signals received internally from within the MDU 300 or 400 in one communication protocol to another communication protocol of an external processor or the PLC 130.

Figure 6:
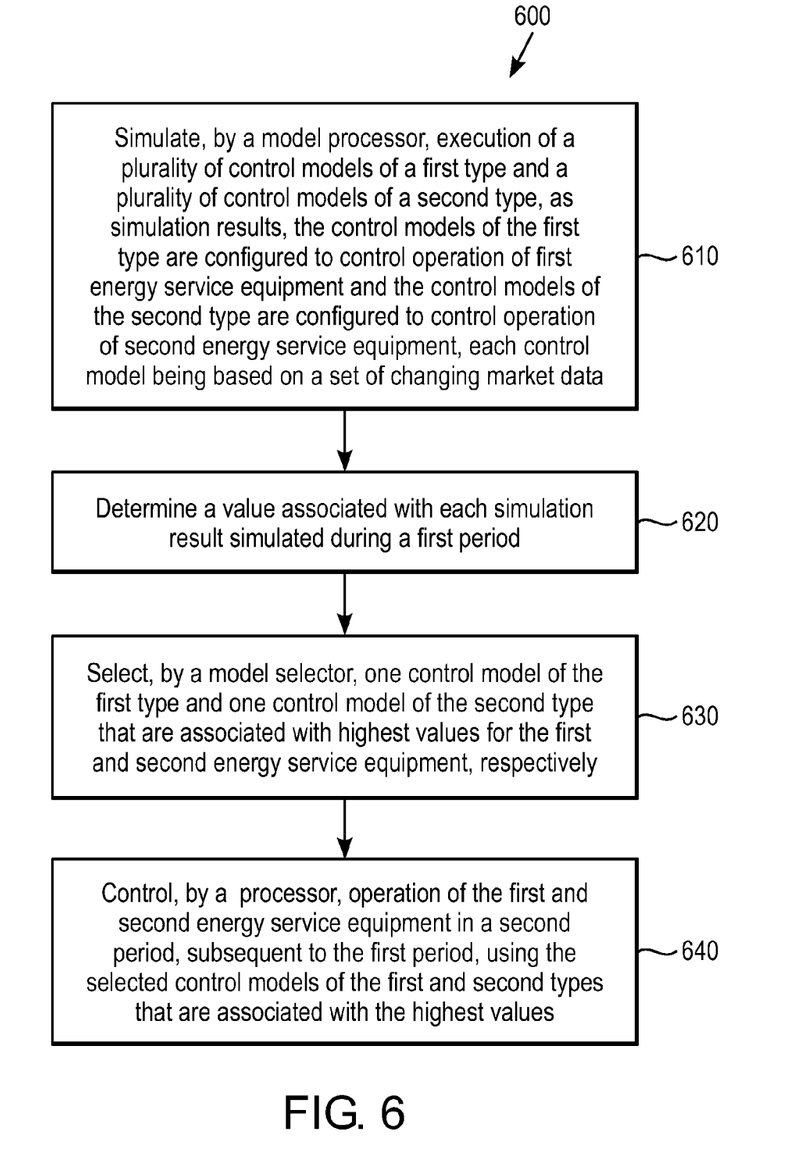
FIG. 6 is a flowchart illustrating a method of controlling energy service using market data in accordance with other exemplary embodiments.

FIG. 6 is a flowchart illustrating a method 600 of controlling energy service using market data in accordance with exemplary embodiments. FIG. 6 is described with continued reference to the embodiments illustrated in FIGS. 3 and 4. However, FIG. 6 is not limited to those embodiments. Note that the steps in the flowchart do not necessarily have to occur in the order shown.

As shown in FIG. 6, the method 600 may control power realized by energy service equipment based on market data.

The method 600 begins in step 610 where the model processor 424 simulates execution of a plurality of control models of a first type and a plurality of control models of a second type, as simulation results. In this step, the control models of the first type can be configured to control operation of first energy service equipment and the control models of the second type can be configured to control operation of second energy service equipment. Each of the control models may be based on set of changing market data. After the control models are configured, the method 600 proceeds to step 620.

In step 620, a value associated with each simulation result is determined during a first period. In an embodiment, this step may be performed by a model processor 424 configured to determine values associated with each simulation result. After a value associated with each simulation has been determined, control is passed to step 630.

In step 630, selections of one control model of the first type and one control model of the second type that are associated with highest value for the first and second energy service equipment, respectively, are made. In an embodiment, this step is performed by a model selector 420 configured to select the one control model of the first type and the one control model of the second type that are associated with highest value for the first and second energy service equipment. After the selections of the control models of the first and second types are made, control is passed to step 640.

In step 640, operation of the first and second energy service equipment in a second period, subsequent to the first period, is controlled using the selected control models of the first and second types that are associated with the highest values. In an embodiment, this step can be performed by using an MDU processor 330 configured to control the first and second energy service equipment in the second period.

In certain exemplary embodiments, the MDU processor 330 may control operation of the first and second energy service equipment in a period subsequent to the second or further period using the selected control models of the first and second types associated with the highest values derived during the second or further period.

In certain exemplary embodiments, the first energy service equipment may be grouped into a first group having a ramp rate of less than a threshold level and the second energy service equipment into a second group having a ramp rate greater than or equal to the threshold level such that the control models of the first type are associated with and control the first group and the control models of the second type are associated with and control the second group.

In certain exemplary embodiments, the MDU 102, 300 or 400 may include a control model selector to select different control models to support different personalities based on the market data received by the MDU 102.

Figure 7:
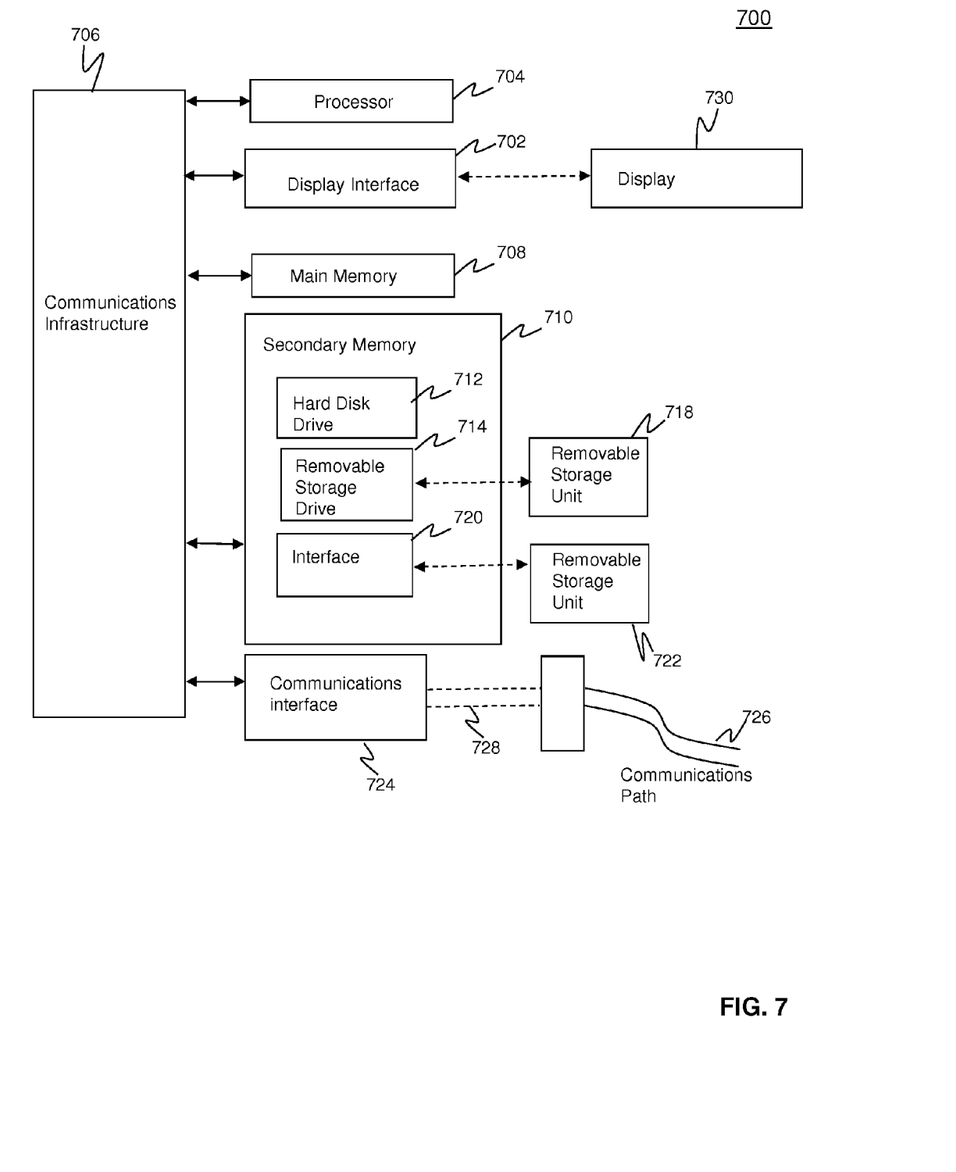
FIG. 7 is a diagram of an example computer system in which embodiments can be implemented.

Although exemplary embodiments have been described in terms of a control models, it is contemplated that they may be implemented in software on microprocessors/general purpose computers such as the computer system 700 illustrated in FIG. 7. In various embodiments, one or more of the functions of the various components may be implemented in software that controls a computing device, such as computer system 700, which is described below with reference to FIG. 7.

Aspects of the present invention shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

FIG. 7 illustrates an example computer system 700 in which embodiments of the present invention, or portions thereof, may be implemented as computer-readable code. For example, the energy service unit 100, MDUs 300 and 400 and methods 500 and 600 of FIGS. 1 and 3-6, can be implemented in computer system 700 using hardware, software, firmware, non-transitory computer readable media having instructions stored thereon, or a combination thereof and may be implemented in one or more computer systems or other processing systems. Hardware, software, or any combination of such may embody any of the modules and components used to implement the components of FIGS. 1, 3 and 4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like.

The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a non-transitory computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor device 704 to implement the processes of the present invention, such as the steps in the methods illustrated by the flowcharts 500 and 600 of FIGS. 5 and 6, discussed above. Accordingly, such computer programs represent controllers of the computer system 700. Where the invention is implemented using software, the software may be stored in a computer program product and loaded into computer system 700 using removable storage drive 714, interface 720, and hard disk drive 712, or communications interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus for controlling power realized by energy service equipment based on market data, the apparatus comprising:
    a model processor for simulating execution of a plurality of control models, as simulation results, and for determining a value associated with each simulation result during a first period, the control models configured to control operation of the energy service equipment, each control model being based on a set of changing market data;

a model selector for selecting the control model associated with a highest value; and
a processor for controlling operation of the energy service equipment in a second period, subsequent to the first period, using the selected control model associated with the highest value.

2. The apparatus of claim 1, wherein the model selector derives the highest value from at least one or more values from periods prior to the second period associated with a respective control model.

3. The apparatus of claim 1, wherein the model selector derives the highest value using a set of predetermined rules.

4. The apparatus of claim 1, wherein:
the model processor determines another value associated with each simulation result during the second period or a further period, subsequent to the first period;
the model selector selects the control model associated with a new highest value using at least a value derived from the second or further period; and
the processor controls operation of the energy service equipment in a period subsequent to the second or further period using the selected control model associated with the new highest value.

5. The apparatus of claim 1, wherein the processor determines operating points for the energy service equipment based on the selected simulation results during a respective period and controls of the power realized by the energy service equipment in accordance with the determined operating points for the respective period.

6. The apparatus of claim 1, further comprising:
a receiver for continuously receiving the market data in one or more information channels,
wherein the model processor matches the market data to one or more of the plurality of control models and simulates execution of each respective control model using the matched market data.

7. The apparatus of claim 1, wherein the market data includes at least one of:
humidity information;
cloud cover information;
precipitation information;
temperature information;
historical pricing information;
historical load information;
expected load forecast;
available and unavailable power generator capacity;
regional event information; or
control signals.

8. The apparatus of claim 1, wherein the model processor determines the value associated with each simulation result during a first period, as a profit margin associated with each simulation result during the first period, the profit margin being based on at least a simulated quantity of power realized and the actual market price received from a grid operator.

9. The apparatus of claim 1, wherein each respective control model is based on a respectively different subset of the market data.

10. The apparatus of claim 1, further comprising:
a protocol converter, coupled to the processor and configured to be coupled to a control processor of the energy service equipment, for receiving control signals in a first communication protocol and for transmitting the control signals in a communication protocol of the control processor.

11. Apparatus for controlling power realized by energy service equipment based on market data, comprising:
a model processor for simulating execution of a plurality of control models of a first type and a plurality of control models of a second type, as simulation results, and for determining a value associated with each simulation result during a first period, the control models of the first type configured to control operation of first energy service equipment and the control models of the second type configured to control operation of second energy service equipment, each control model being based on a set of changing market data;
a model selector for selecting one control model of the first type and one control model of the second type that are associated with highest values for the first and second energy service equipment, respectively; and
a processor for controlling operation of the first and second energy service equipment in a second period, subsequent to the first period, using the selected control models of the first and second types that are associated with the highest values.

12. The apparatus of claim 11, wherein the model selector derives the highest values for the control models of the first and second type from at least one or more values from periods prior to the second period and selects the control model using selection criteria based on predetermined rules.

13. The apparatus of claim 11, wherein:
the model processor determines another value associated with each simulation result during the second period or a further period, subsequent to the first period;
the model selector selects one control model of the first type and one control model of the second type that are associated with new highest values derived from values associated with at least the second or further period; and
the processor controls operation of the first and second energy service equipment in a period subsequent to the second or further period using the selected control models of the first and second types associated with the new highest values.

14. The apparatus of claim 11, wherein the control models of the first type are control models having ramp rates that are greater than the ramp rates of the control models of the second type.

15. The apparatus of claim 11, wherein the processor establishes operating points for the first and second energy service equipment based on the results of the selected control models of the first and second types, respectively, and controls the power realized from the first and second equipment using the established operating points.

16. A system for controlling power realized from a plurality of different energy service equipment using received market data, comprising:
a model processor configured to simulate execution of plural sets of models, each model of a respective set using the received market data to generate a corresponding simulation result;
a model selector configured to select one of the models of each respective set based on the corresponding simulation results of the models of the respective set; and
a processor configured to control operation of the different energy service equipment using the selected model of each respective set.

17. The system of claim 16, wherein:
the model processor is further configured to determine a value associated with each of the different energy service equipment for each respective simulation result based on the received market data; and the model selector is further configured to select one of the control models of each respective set based on its associated value.

18. A method of controlling power realized by energy service equipment using market data, comprising:
simulating, by a model processor, execution of a plurality of control models, as simulation results, each control model being based on a set of changing market data for controlling operation of the energy service equipment;
selecting one of the control models during a first period; and
controlling operation of the energy service equipment in a second period, subsequent to the first period, using the selected control model.

19. The method of claim 18, further comprising:
determining a value associated with each simulation result simulated during the first period, wherein the selecting of one of the control models during the first period includes selecting one of the control models based on the value associated with the simulation result of the selected control model simulated during the first period.

20. The method of claim 18, wherein the value includes one of:
a profit margin;
a monetary value; or
a common attribute value.

21. The method of claim 18, further comprising:
determining another value associated with each simulation result during the second period or a further period, subsequent to the first period;
selecting the control model associated with a highest value during the second or further period;
controlling operation of the energy service equipment in a period subsequent to the second or further period using the selected control model associated with the highest value during the second or further period.

22. The method of claim 18, wherein the controlling of the operation of the energy service equipment in the second period includes:
determining, by the processor, operating points for the energy service equipment; and
managing the power realized by the energy service equipment in accordance with the determined operating points.

23. The method of claim 18, further comprising:
receiving the market data in one or more information channels;
matching the market data to one or more of the plurality of control models; and
executing a respective control model using the matched market data. model.

24. The method of claim 23, wherein the simulating of execution of the control models includes:
simulating execution of each respective control model based on a subset of the market data associated with a respective period.

25. The method of claim 18, further comprising:
converting, by a protocol converter, control signals received internally in one communication protocol to another communication protocol of an external processor.

26. A method for controlling power realized by energy service equipment based on market data, comprising:
simulating, by a model processor, execution of a plurality of control models of a first type and a plurality of control models of a second type, as simulation results, the control models of the first type configured to control operation of first energy service equipment and the control models of the second type configured to control operation of second energy service equipment, each control model being based on set of changing market data,
determining a value associated with each simulation result simulated during a first period;
selecting, by a model selector, one control model of the first type and one control model of the second type that are associated with highest values for the first and second energy service equipment, respectively; and
controlling, by a processor, operation of the first and second energy service equipment in a second period, subsequent to the first period, using the selected control models of the first and second types that are associated with the highest values.

27. The method of claim 26, further comprising:
grouping the first energy service equipment into a first group having a ramp rate of less than a threshold level and the second energy service equipment into a second group having a ramp rate greater than or equal to the threshold level such that the control models of the first type are associated with and control the first group and the control models of the second type are associated with and control the second group.

28. The method of claim 26, further comprising:
establishing operating points for the first and second energy service equipment using the selected control models of the first and second types, respectively, and
controlling the power realized from the first and second equipment using the established operating points.

29. A non-transitory computer readable storage medium having instructions stored thereon that, in response to execution by a computing device, cause the computing device to perform operations for controlling power realized by energy service equipment based on market data, the operations comprising:
simulating execution of a plurality of control models, as simulation results, each control model being based on set of changing market data for controlling operation of energy service equipment;
selecting one of the control models during the first period; and
controlling operation of the energy service equipment in a second period, subsequent to the first period, using the selected control model.

* * * * *